United States Patent
Cybulsky et al.

(10) Patent No.: US 10,724,999 B2
(45) Date of Patent: Jul. 28, 2020

(54) THERMAL SPRAY DIAGNOSTICS

(71) Applicant: Rolls-Royce Corporation, Indianapolis, IN (US)

(72) Inventors: Michael Cybulsky, Indianapolis, IN (US); Raymond J. Sinatra, Indianapolis, IN (US); Matthew R. Gold, Carmel, IN (US); Taylor K. Blair, Blacksburg, VA (US); Gary Pickrell, Blacksburg, VA (US); Romesh Batra, Blacksburg, VA (US)

(73) Assignee: Rolls-Royce Corporation, Indianapolis, IN (US)

( * ) Notice: Subject to any disclaimer, the term of this patent is extended or adjusted under 35 U.S.C. 154(b) by 41 days.

(21) Appl. No.: 15/172,362

(22) Filed: Jun. 3, 2016

(65) Prior Publication Data
US 2016/0354796 A1    Dec. 8, 2016

Related U.S. Application Data

(60) Provisional application No. 62/171,045, filed on Jun. 4, 2015.

(51) Int. Cl.
*B05B 1/00*    (2006.01)
*B05B 7/16*    (2006.01)
(Continued)

(52) U.S. Cl.
CPC .............. *G01N 29/46* (2013.01); *B05B 1/002* (2018.08); *B05B 12/006* (2013.01); *B05B 15/18* (2018.02);
(Continued)

(58) Field of Classification Search
CPC ....................................................... G01N 29/46
See application file for complete search history.

(56) References Cited

U.S. PATENT DOCUMENTS 2,099,074 A    11/1937    Mueller
2,361,458 A    10/1944    Converse
(Continued)

FOREIGN PATENT DOCUMENTS

DE    102015109873 A1    12/2016
EP    0481382 A1    4/1992
(Continued)

OTHER PUBLICATIONS

Xi, et al., "Monitoring of Nozzle Wear during Plasma Spray," Thermal Spray 1997: A United Forum for Scientific and Technological Advances, ASM International., Sep. 15-18, 1997.
(Continued)

*Primary Examiner* — Raymond L Nimox
(74) *Attorney, Agent, or Firm* — Shumaker & Sieffert, P.A.

(57) ABSTRACT

An example system includes at least one acoustic sensor configured to generate at least one time-dependent acoustic data signal indicative of an acoustic signal generated by a thermal spray system performing a process possessing a plurality of process attributes, and a computing device including an acoustic data signal processing module configured to receive the at least one time-dependent acoustic data signal, and transform the at least one time-dependent acoustic data signal to a frequency-domain spectrum, wherein each process attribute of the plurality of process attributes is associated with at least one respective frequency band, and a correlation module configured to determine a process attribute of the plurality of process attributes by identifying at least one characteristic of the frequency-domain spectrum.

18 Claims, 7 Drawing Sheets

(51) Int. Cl.
| | |
|---|---|
| *B05B 12/00* | (2018.01) |
| *B05B 15/18* | (2018.01) |
| *G01N 29/14* | (2006.01) |
| *G01N 29/44* | (2006.01) |
| *G01N 29/46* | (2006.01) |

(52) U.S. Cl.
CPC ......... *G01N 29/14* (2013.01); *G01N 29/4427* (2013.01); *B05B 7/16* (2013.01); *G01N 2291/02425* (2013.01); *G01N 2291/02836* (2013.01)

(56) References Cited

U.S. PATENT DOCUMENTS

| | | | |
|---|---|---|---|
| 3,580,092 | A | 5/1971 | Scarpa |
| 4,260,944 | A | 4/1981 | O'Mahony |
| 4,550,615 | A | 11/1985 | Grant |
| 4,586,386 | A | 5/1986 | Hollstein et al. |
| 4,613,259 | A | 9/1986 | Packer et al. |
| 4,621,519 | A | 11/1986 | Phillips |
| 4,811,605 | A | 3/1989 | Nadeau et al. |
| 4,850,229 | A | 7/1989 | Phillips |
| 4,856,321 | A | 8/1989 | Smalling et al. |
| 4,905,897 | A | 3/1990 | Rogers et al. |
| 5,014,447 | A | 5/1991 | Hagen |
| 5,101,774 | A | 4/1992 | Marziale et al. |
| 5,180,921 | A | 1/1993 | Moreau et al. |
| 5,455,868 | A | 10/1995 | Sergent |
| 5,654,797 | A | 8/1997 | Moreau et al. |
| 5,757,498 | A | 5/1998 | Klein, II et al. |
| 5,912,471 | A | 6/1999 | Schutz |
| 5,928,731 | A | 7/1999 | Yanagida et al. |
| 5,986,277 | A | 11/1999 | Bourque et al. |
| 6,014,447 | A | 1/2000 | Kohnen et al. |
| 6,185,153 | B1 | 2/2001 | Hynes et al. |
| 6,437,694 | B1 | 8/2002 | Lee |
| 6,438,239 | B1* | 8/2002 | Kuchen ................ B05B 12/004 239/74 |
| 6,507,023 | B1* | 1/2003 | Parham ................. G08B 17/12 250/339.15 |
| 6,684,702 | B2 | 2/2004 | Ziada |
| 6,853,951 | B2 | 2/2005 | Jarrell et al. |
| 6,940,409 | B1 | 9/2005 | Green |
| 6,988,857 | B2 | 1/2006 | Kroemmer et al. |
| 7,034,244 | B2 | 4/2006 | Matus |
| 7,043,069 | B1 | 5/2006 | Heinrich et al. |
| 7,114,889 | B2 | 10/2006 | Kanou et al. |
| 7,278,294 | B2 | 10/2007 | Giles et al. |
| 7,290,450 | B2 | 11/2007 | Brown et al. |
| 7,311,004 | B2 | 12/2007 | Giles |
| 7,389,278 | B2 | 6/2008 | Unsworth et al. |
| 7,499,836 | B1 | 3/2009 | Mooney |
| 7,665,348 | B2 | 2/2010 | Giles |
| 7,802,687 | B2 | 9/2010 | Fritz et al. |
| 7,881,884 | B2 | 2/2011 | Perry et al. |
| 7,891,315 | B2 | 2/2011 | Barbezat |
| 7,982,351 | B2 | 7/2011 | Atallah et al. |
| 8,121,588 | B2 | 2/2012 | Gottlieb |
| 8,193,942 | B2 | 6/2012 | White et al. |
| 8,231,310 | B2 | 7/2012 | Sanwald |
| 8,250,907 | B2 | 8/2012 | Giles |
| 8,510,014 | B2 | 8/2013 | Nomura et al. |
| 8,542,124 | B2 | 9/2013 | Timm |
| 9,062,682 | B2 | 6/2015 | Loose et al. |
| 9,099,074 | B1* | 8/2015 | Lucon ....................... E04B 1/84 |
| 9,709,466 | B2 | 7/2017 | Kwon et al. |
| 10,241,091 | B2 | 3/2019 | Cybulsky et al. |
| 10,274,364 | B2 | 4/2019 | Blair et al. |
| 2002/0153117 | A1 | 10/2002 | Allor et al. |
| 2003/0087040 | A1 | 5/2003 | Ladentin |
| 2004/0030524 | A1 | 2/2004 | Jarrell et al. |
| 2005/0011278 | A1 | 1/2005 | Brown et al. |
| 2005/0041238 | A1 | 2/2005 | Ludviksson et al. |
| 2005/0241761 | A1 | 11/2005 | Kannan et al. |
| 2006/0071666 | A1 | 4/2006 | Unsworth et al. |
| 2007/0044572 | A1 | 3/2007 | Davis et al. |
| 2007/0264439 | A1 | 11/2007 | Abdullahi et al. |
| 2007/0279235 | A1 | 12/2007 | Davis et al. |
| 2008/0184793 | A1 | 8/2008 | Mauchle et al. |
| 2008/0189057 | A1 | 8/2008 | Perry et al. |
| 2008/0197730 | A1 | 8/2008 | Himmelmann et al. |
| 2009/0068978 | A1 | 3/2009 | Gottlieb |
| 2009/0072645 | A1 | 3/2009 | Quere |
| 2010/0071616 | A1 | 3/2010 | Mauchle et al. |
| 2010/0132439 | A1* | 6/2010 | Giles .................... G01N 29/032 73/64.53 |
| 2011/0005420 | A1 | 1/2011 | Fullerton |
| 2011/0118998 | A1 | 5/2011 | Loose et al. |
| 2011/0308812 | A1 | 12/2011 | Bullen |
| 2012/0037074 | A1 | 2/2012 | Outland |
| 2013/0067992 | A1 | 3/2013 | Sinha et al. |
| 2013/0181562 | A1 | 7/2013 | Gieras et al. |
| 2013/0187501 | A1 | 7/2013 | Theobald et al. |
| 2013/0243535 | A1 | 9/2013 | Volonte et al. |
| 2014/0010968 | A1 | 1/2014 | Prest et al. |
| 2014/0072125 | A1 | 3/2014 | Cohn et al. |
| 2014/0113840 | A1* | 4/2014 | Margalit .......... G01N 33/54373 506/39 |
| 2014/0200837 | A1* | 7/2014 | Blair ....................... G01N 29/14 702/48 |
| 2015/0315980 | A1 | 11/2015 | Edwards et al. |
| 2015/0362418 | A1* | 12/2015 | Newton ................. G01N 15/02 73/61.75 |
| 2016/0087517 | A1 | 3/2016 | Powell et al. |
| 2016/0223496 | A1 | 8/2016 | Klos et al. |
| 2016/0354796 | A1 | 12/2016 | Cybulsky et al. |
| 2016/0356747 | A1 | 12/2016 | Cybulsky et al. |
| 2017/0104398 | A1 | 4/2017 | Peng et al. |
| 2018/0154377 | A1 | 6/2018 | Blair et al. |

FOREIGN PATENT DOCUMENTS

| | | |
|---|---|---|
| EP | 1036856 A1 | 9/2000 |
| EP | 1205748 A1 | 5/2002 |
| EP | 1336841 A2 | 8/2003 |
| EP | 3128321 A1 | 2/2017 |
| WO | 2005085489 A1 | 9/2005 |
| WO | 2014110486 A1 | 4/2014 |
| WO | 2016/172316 A1 | 10/2016 |

OTHER PUBLICATIONS

Lenain et al., "New Approaches of the Forecast of the Aging of Plasma Jet Nozzle in Industrial Settings of Thermal Spraying," Sep. 23, 2011, University of Limoges; hal.archives-overtes.fr. 20 pp.

Leblanc et al., Long Term Stability of Plasma Spraying: Study of the Evolution of the In-Flight Particle State Coating Microstructure, Voltage and Acoustic Signatures, In Tagungsband Conference Proceedings., Sep. 2002, 7 pp.

Rigot, "Contribution of the study of the electrode erosion in dc plasma spray torches through the on-line following of voltage and sound signals," Nov. 2003 University of Limoges, 3 pp.

U.S. Appl. No. 15/172,441, filed by Cybulsky et al. filed Jun. 3, 2016.

Read, International Thermal Spray Association, Keynote address, China International Thermal Spray Conference and the 16th National Thermal Spraying Seminar, Dalian, China, Sep. 22-25, 2003, 68 pp.

Umeda et al., "On the sound sources of screech tones radiated from choked circular jets", The Journal of the Acoustical Society of America, vol. 110, No. 4, Oct. 2001, 14 pp.

Hou et al., "Acoustic Monitoring of Hydrocyclone Performance," Minerals Engineering, vol. 11, No. 11, Sep. 1998, pp. 1047-1059.

U.S. Appl. No. 15/833,546, filed Dec. 6, 2017, by Blair et al.

Kanta et al., "Artificial Neural Networks vs. Fuzzy Logic: Simple Tools to Predict and Control Complex Processes—Application to Plasma Spray Processes," Journal of Thermal Spray Technology, vol. 17, No. 3, Sep. 2008, pp. 365-376.

Kovacevic et al., "On-line monitoring of the electric arc-spraying process based on acoustic signatures," Journal of Engineering Manufacture, vol. 209, Oct. 1, 1995, 11 pp.

(56) References Cited

OTHER PUBLICATIONS

Faisal et al., "Application of acoustic emission for monitoring the HVOF thermal spraying process," 27th European Working Group on Acoustic Emission, Sep. 21, 2006, 15 pp.

Braeuel et al., "An Acoustic Method for the Detection of Defects in the Nozzle of Plasma Cutting Torches," IEEE Transactions on Ultrasonics, Ferroelectrics, and Frequency Control, Mar. 1987, 4 pp.

Rat et al., "Acoustic signature analysis of the interaction between a dc plasma jet and a suspension liquid jet," Journal of Physics D: Applied Physics, Sep. 18, 2009, 13 pp.

Blair, "Development of a Plasma Spray Process Monitoring System through Aeroacoustic Signal Analysis", Feb. 17, 2015, 157 pgs.

Adams et al., "A Condition Monitoring System for Low Vacuum Plasma Spray using Computer Vision", 2018 IEEE International Conference on Prognostics and Health Management (ICPHM), Jun. 11, 2018, 7 pgs.

* cited by examiner

THERMAL SPRAY DIAGNOSTICS

This application claims the benefit of U.S. Provisional Application No. 62/171,045, filed Jun. 4, 2015, which is incorporated by reference in its entirety.

TECHNICAL FIELD

The disclosure relates to thermal spray systems.

BACKGROUND

Thermal spray systems are used in a wide variety of industrial applications to coat targets with coating material to modify or improve the properties of the target surface. Coatings may include thermal barrier coatings, hard wear coatings, ablative coatings, or the like. Thermal spray systems use heat generated electrically, by plasma, or by combustion to heat material injected in a plume, so that molten material propelled by the plume contact the surface of the target. Upon impact, the molten material adheres to the target surface, resulting in a coating.

SUMMARY

In some examples, the disclosure describes a system including at least one acoustic sensor configured to generate at least one time-dependent acoustic data signal indicative of an acoustic signal. The acoustic signal is generated by a thermal spray system performing a process possessing a plurality of process attributes. The system also may include a computing device that includes an acoustic data signal processing module. The acoustic data signal processing module may be configured to receive the at least one time-dependent acoustic data signal, and transform the at least one time-dependent acoustic data signal to a frequency-domain spectrum. Each process attribute of the plurality of process attributes may be associated with at least one respective frequency band. The computing device may additionally include a correlation module configured to determine a process attribute of the plurality of process attributes by identifying at least one characteristic of the frequency-domain spectrum.

In some examples, the disclosure describes a method including receiving, by a computing device, from at least one acoustic sensor, at least one time-dependent acoustic data signal indicative of an acoustic signal generated by a thermal spray system performing a process possessing a plurality of process attributes. The method also may include transforming, by the computing device, the at least one time-dependent acoustic data signal to a frequency-domain spectrum. Each process attribute of the plurality of process attributes may be associated with at least one respective frequency band. Further, the method may include determining, by the computing device, a process attribute of the plurality of process attributes by identifying at least one characteristic of the frequency-domain spectrum.

In some examples, the disclosure describes a computer readable storage medium. In this example, the computer readable storage medium includes instructions that, when executed, cause at least one processor to receive, from at least one acoustic sensor, at least one time-dependent acoustic data signal indicative of an acoustic signal. The acoustic signal is generated by a thermal spray system performing a process possessing a plurality of process attributes. The computer readable storage medium also may include instructions that, when executed, cause at least one processor to transform the at least one time-dependent acoustic data signal to a frequency-domain spectrum. Each process attribute of the plurality of process attributes may be associated with at least one respective frequency band. The computer readable storage medium additionally may include instructions that, when executed, cause at least one processor to determine a process attribute of the plurality of process attributes by identifying at least one characteristic of the frequency-domain spectrum.

The details of one or more examples are set forth in the accompanying drawings and the description below. Other features, objects, and advantages will be apparent from the description and drawings, and from the claims.

DETAILED DESCRIPTION

Figure 1:
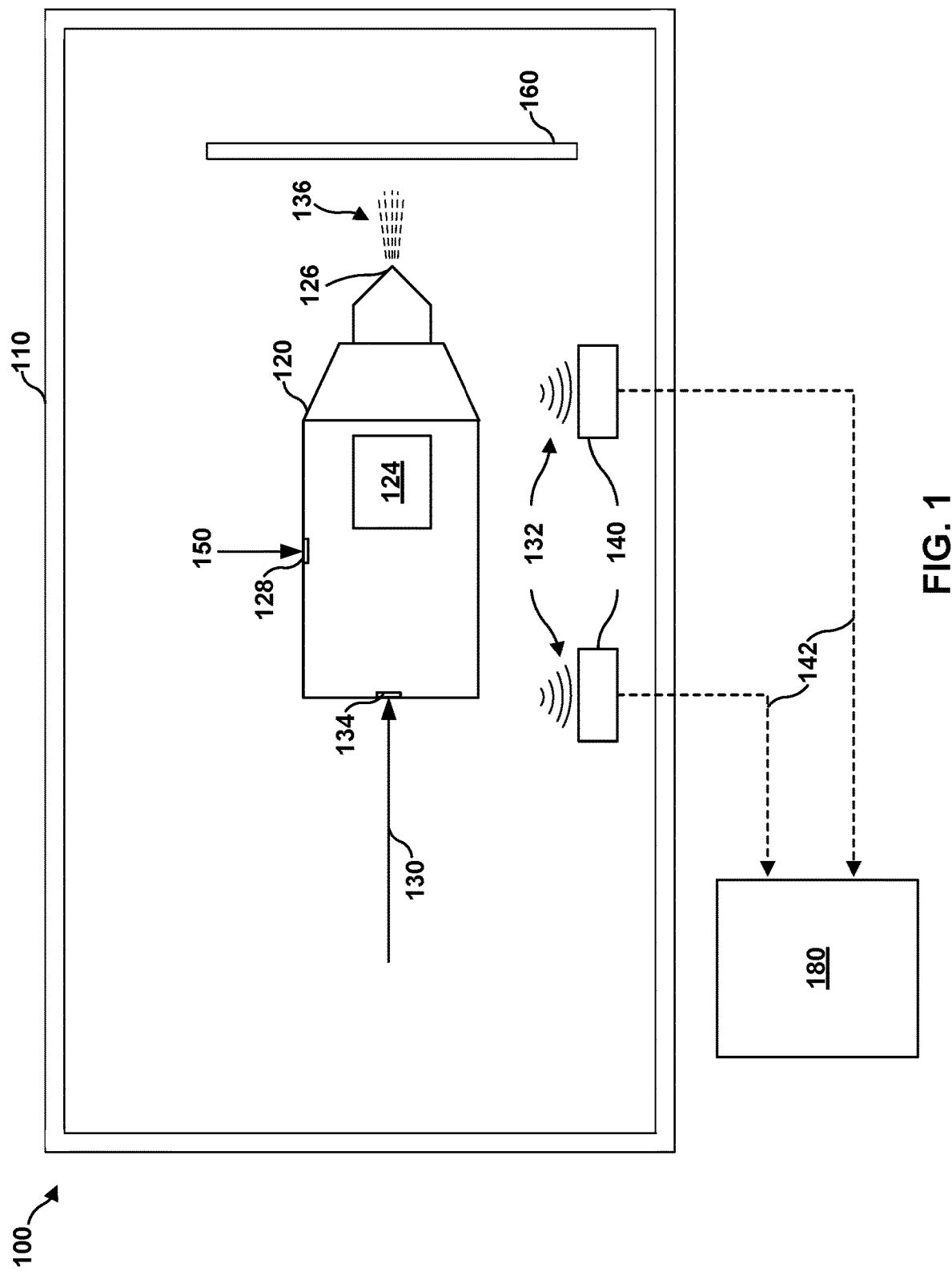
FIG. 1 is a conceptual block diagram illustrating an example thermal spray system including a computing device for analyzing an acoustic signal generated by a thermal spray system performing a process possessing a plurality of process attributes to determine a process attribute of the plurality of process attributes.

The disclosure describes systems and techniques for analyzing an acoustic signal generated by a thermal spray process to determine one or more attributes of the thermal spray process. A thermal spray system may include at least one component, such as a spray gun, a powder feed system, a gas feed system, or like.

During a thermal spray process, the spray gun receives spray material and a carrier gas, at least partially melts the spray material, and directs the at least partially melted spray material toward a spray target using the carrier gas. The at least partially melted spray material contacts the spray target to provide a coating of the spray material on the spray target. In some examples, the quality of the coating on the spray target may depend on process attributes including, for instance, the spray material composition and flow rate; the carrier gas composition, temperature, and flow rate; the spray target composition and shape; the condition of the at least one component (e.g., the spray gun); and the like.

Unsatisfactory coating characteristics may result from variances in process attributes, including process parameters, component wear, or both.

During operation of the thermal spray system, the at least one component may generate an acoustic signal (e.g., sound), which may be associated with thermal spray parameters, a condition of the at least one component, or both. The thermal spray system may include at least one acoustic sensor configured to generate at least one time-dependent acoustic data signal representative of the acoustic signal generated by the at least one component. The system also may include a computing device configured to analyze the at least one time-dependent acoustic data signal.

The time-dependent acoustic data signal may be rich in information, and may include data representative of acoustic signals generated by one or more component of the thermal spray system. The acoustic signals may also be representative of process parameters or variations in process parameters. For example, the acoustic signal generated by the spray gun may depend upon process attributes including, for example, geometry of the spray gun nozzle, including wear of the spray gun nozzle, powder flow rate, powder flow pulsing, gas flow rate, powder composition, or the like. In this way, the computing device may analyze the time-dependent acoustic data signal to determine whether process attributes associated with the spray gun are within a nominal or expected range, or if the process attributes are varying compared to an expected value.

In some examples, the thermal spray system may include a plurality of acoustic sensors, and respective acoustic sensors may be positioned near respective components of the thermal spray process. In some examples, each acoustic sensor of the plurality of acoustic sensors may generate a respective at least one time-dependent acoustic data signal. Because of the different positions of the respective acoustic sensors, the computing device may analyze the respective time-dependent acoustic data signals to determine information related to respective components of the thermal spray system. For example, each respective time-dependent acoustic data signal may be associated with the respective component to which the respective acoustic sensor is near. Alternatively or additionally, the computing device may utilize the intensity of respective frequency components of at least one time-dependent acoustic data signal to determine, e.g., based on distance, to which component the sound may be attributed. In this way, the computing device may analyze the time-dependent acoustic data signal or time-dependent acoustic data signals to determine process attributes for a plurality of components of the thermal spray system.

By utilizing the at least one time-dependent acoustic data signal, the thermal spray system described herein may perform real-time or near real-time analysis of operation of at least one component of the thermal spray system. Further, monitoring a time-dependent acoustic data signal representative of one or more outputs of the thermal spray system may provide a more accurate indication of process attributes of the thermal spray system, e.g., compared to monitoring inputs to the thermal spray system using a flow meter, flow controller, amp meter, or voltmeter. Further, in some examples, flow meters, flow controllers, amp meters, and voltmeters may require calibration, and falling out of calibration may reduce the accuracy of the feedback provided by out-of-calibration flow meters, flow controllers, amp meters, and voltmeters.

FIG. 1 is a block diagram illustrating an example thermal spray system 100. In some examples, thermal spray system 100 includes components such as an enclosure 110, a thermal spray gun 120, at least one acoustic sensor 140, and a computing device 180.

Enclosure 110 encloses some components of thermal spray system 100, including, for example, thermal spray gun 120 and at least one acoustic sensor 140. In some examples, enclosure 110 substantially completely surrounds thermal spray gun 120 and at least one acoustic sensor 140 and encloses an atmosphere. The atmosphere may include, for example, air, an inert atmosphere, a vacuum, or the like. In some examples, the atmosphere may be selected based on the type (e.g., composition) of coating being applied using thermal spray system 100. Enclosure 110 also encloses a spray target 160.

Spray target 160 includes a substrate to be coated using thermal spray system 100. In some examples, spray target 160 may include, for example, a substrate on which a bond coat, a primer coat, a hard coat, a wear-resistant coating, a thermal barrier coating, an environmental barrier coating, or the like is to be deposited. Spray target 160 may include a substrate or body of any regular or irregular shape, geometry or configuration. In some examples, spray target 160 may include metal, plastic, glass, or the like. Spray target 160 may be a component used in any one or more mechanical systems, including, for example, a high temperature mechanical system such as a gas turbine engine.

Thermal spray gun 120 is coupled to a gas feed line 130 via gas inlet port 134, is coupled to a spray material feed line 150 via material inlet port 128, and includes or is coupled to an energy source 124. Gas feed line 130 provides a gas flow to gas inlet port 134 of thermal spray gun 120. Depending upon the type of thermal spray process being performed, the gas flow may be a carrier gas for the coating material, may be a fuel that is ignited to at least partially melt the coating material, or both. Gas feed line 130 may be coupled to a gas source (not shown) that is external to enclosure 110.

Thermal spray gun 120 also includes a material inlet port 128, which is coupled to spray material feed line 150. Material feed line 150 may be coupled to a material source (not shown) that is located external to enclosure 110. Coating material may be fed through material feed line 150 in powder form, and may mix with gas from gas feed line 130 within thermal spray gun 120. The composition of the coating material may be based upon the composition of the coating to be deposited on spray target 160, and may include, for example, a metal, an alloy, a ceramic, or the like.

Thermal spray gun 120 also includes energy source 124. Energy source 124 provides energy to at least partially melt the coating material from coating material provided through material inlet port 128. In some examples, energy source 124 includes a plasma electrode, which may energize gas provided through gas feed line 130 to form a plasma. In other examples, energy source 124 includes an electrode that ignites gas provided through gas feed line 130.

As shown in FIG. 1, an exit flowstream 136 exits outlet 126 of thermal spray gun 120. In some examples, outlet 126 includes a spray gun nozzle. Exit flowstream 136 may include at least partially melted coating material carried by a carrier gas. Outlet 126 may be configured and positioned to direct the at least partially melted coating material at spray target 160.

Thermal spray system 100 includes at least one acoustic sensor 140. In some examples, as shown in FIG. 1, thermal spray system 100 includes a plurality of acoustic sensors, such as at least two acoustic sensors 140. Each of the at least one acoustic sensor 140 is configured to sense acoustic signals 132 (e.g., sound). Acoustic signals 132 may be generated by one or more components or processes of thermal spray system 100. The at least one acoustic sensor 140 may include, for example, an acoustic sensing element such as a microphone or a sound-to-electric transducer or electromagnetic, capacitive, or piezoelectric elements that generate an electrical signal in response to incident sound waves.

The at least one acoustic sensor 140 may be configured to sense acoustic signals 132 with a predetermined wavelength or wavelength range. In some examples, the at least one acoustic sensor 140 may be configured to sense acoustic signals 132 that may or may not be detectable by human hearing, including infrasound and ultrasound. In some examples, acoustic signals 132 may include frequencies below about 20 Hz, from about 20 Hz to about 20 kHz, from about 20 kHz to about 2 MHz, higher than about 2 MHz, or combinations thereof. Each acoustic sensor of the at least one acoustic sensor 140 is configured to generate a respective time-dependent acoustic data signal of at least one time-dependent acoustic data signal 142 based on the sensed acoustic signal 132 and communicate at least one time-dependent acoustic data signal 142 to computing device 180. In some examples, at least one time-dependent acoustic data signal 142 includes a digital data signal, and at least one acoustic sensor 140 includes an analog-to-digital converter. In other examples, at least one time-dependent acoustic data signal 142 may include an analog signal. In some examples, at least one acoustic sensor 140 may include an amplifier to amplify the signal sensed by at least one acoustic sensor 140 and produce the at least one time-dependent acoustic data signal 142. At least one acoustic sensor 140 may transmit at least one time-dependent acoustic data signal 142 using electrical signals, Bluetooth, Wi-Fi, radio, or any other suitable transmission pathway.

Computing device 180 may be configured to control operation of one or more components of thermal spray system 100 automatically or under control of a user. For example, computing device 180 may be configured to control operation of thermal spray gun 120, gas feed line 130 (and the source of gas to gas feed line 130), material feed line 150 (and the source of material to material feed line 150), at least one acoustic sensor 140, and the like. Computing device 180 also may be configured to receive at least one time-dependent acoustic data signal 142 from at least one acoustic sensor 140 and analyze the at least one time-dependent acoustic data signal 142 to determine one or more process attributes of thermal spray system 100.

During a thermal spray process, thermal spray system 100 performs at least one process, such as depositing a coating of spray material on spray target 160. Thermal spray system 100 and the thermal spray process performed by thermal spray system 100 possess a plurality of process attributes. The process attributes may include process parameters, component wear, and the like. Process parameters may deviate from designed or nominal values. Computing device 180 may be configured to compare the process deviations to the nominal or designed process parameters. For example, process parameters may include at least one of a temperature, a pressure, a mass flow rate, a volumetric flow rate, a molecular flow rate, a molar flow rate, a composition or a concentration, of a flowstream flowing through thermal spray system 100, for instance, of gas flowing through gas feed line 130, or of exit flowstream 136, or of material flowing through material feed line 150. In some examples, the process deviations may include at least one of material feed fluctuation, for instance, powder pulsing, flow blockage (for e.g., of one or more of gas feed line 130, exit flowstream 136, material feed line 150), gas leakage, or a process deviation resulting from incompatibility (for e.g., wrong type or configuration of a component, for instance, using a nozzle that is unsuitable for a high viscosity flow) or wear of the at least one component. In some examples, wear of the at least one component may include wear of thermal spray gun 120, including wear of thermal spray outlet 126, wear of energy source 124, and wear of material inlet port 128, for instance, powder port wear.

As described above, components of thermal spray system 100 and processes performed by thermal spray system 100 generate acoustic signals 132 during the thermal spray process. For example, acoustic signals 132 may originate from thermal spray gun 120 (e.g., energy source 124, thermal spray outlet 126, material inlet port 128, or gas inlet port 134), gas feed line 130, exit flowstream 136, spray material feed line 150, impact of the coating material against spray target 160, or any other component associated with thermal spray system 100, such as a coating material hopper, a coating material feeder, a gun or part manipulating robot or machine, an air handling system, a dust filtering system, or the like.

Acoustic signals 132 generated by the components depend on process attributes, and may change in response to process attributes changing. For example, acoustic signals 132 produced by gas feed line 130 may change in response to any one or more of the temperature, pressure, flowrate, viscosity, composition, or concentration of the flowstream in gas feed line 130 changing. Similarly, acoustic signals 132 produced by material feed line 130 may change in response to any one or more of the temperature, pressure, flowrate, viscosity, composition, or concentration of the carrier gas of the spray material in material feed line 150 changing. Acoustic signals 132 produced by exit flowstream 136 may change in response to, for example, any one or more of the temperature, pressure, flowrate, viscosity, composition, or concentration of exit flowstream 136 changing. Acoustic signals 132 produced by spray target 160 may change in response to any one or more of the temperature, pressure, flowrate, viscosity, composition, or concentration of the spray material impacting the spray target changing, or the composition, bulk or surface geometry of spray target 160 changing, or even in response to the thickness of the coating of spray material on spray target 160 changing. Acoustic signals 132 generated by gas feed port 134, material feed port 128, spray outlet 126 may change as the respective component wears. In some examples, acoustic signals 132 generated by a worn spray outlet 126, for instance, a worn nozzle, differs from acoustic signals 132 generated by a new (e.g., previously unused) nozzle.

In some examples, respective process attributes may be associated with one or more respective frequency bands within acoustic signals 132. For example, a peak frequency in the tens of kilohertz (kHz; e.g., between about 13 kHz and about 15 kHz) may be associated with spray outlet 126, such as a spray nozzle, and may change as the spray outlet 126 mechanically wears. Other process attributes may similarly be associated with respective frequencies or frequency bands, which may change in frequency value, intensity, or the like, based on the value of the process attribute.

In some examples, acoustic signals 132 may be affected by the portion of the thermal spray process which is being performed. For example, acoustic signals 132 generated during an initial startup period by components of thermal spray system 100 may differ from acoustic signals 132 generated when thermal spray system 100 is performing a spraying process, or acoustic signals 132 generated when thermal spray system 100 is being shut down. Hence, computing device 180 may analyze at least one time-dependent acoustic data signal 142 to determine at which portion of the thermal spray process thermal spray system 100 is, or a user may identify the portion of the thermal spray process at which thermal spray system 100 is, and computing device 180 may utilize this information when analyzing at least one time-dependent acoustic data signal 142.

Other factors may result in acoustic signals 132 changing. For example, acoustic signals 132 generated by components of thermal spray system 100 in a first configuration may differ acoustic signals 132 generated in a second configuration. In some examples, computing device 180 may analyze a respective time-dependent acoustic data signal of at least one time-dependent acoustic data signal 142 to identify the configuration of components of thermal system 132, or the stage or progress of a process performed by thermal spray system 100, or a stage or progress of a subprocess performed by one or more components of thermal spray system 100. In some examples, computing device 180 may identify the process stage at which thermal spray system 100 is operating by comparing a respective time-dependent acoustic data signal of at least one time-dependent acoustic data signal 142 of thermal spray system 100 in the unknown process stage to a time-dependent acoustic data signal from a known configuration or process stage of a thermal spray system.

In some examples, at least one acoustic sensor 140 may be configured to enhance detection of one or more acoustic signal of acoustic signals 132 compared to another one or more acoustic signal of acoustic signals 132. For instance, a first acoustic sensor of at least one acoustic sensor 140 may be positioned adjacent to a selected component of thermal spray system 100, oriented toward a selected component of thermal spray system 100, or the like to enhance detection of a selected acoustic signal of acoustic signals 132 compared to another one or more acoustic signal of acoustic signals 132. For example, a first acoustic sensor of at least one acoustic sensor 140 may be positioned to sense acoustic signals 132 originating from thermal spray gun 120 (e.g., material inlet port 128, gas inlet port 134, spray outlet 126), and a second acoustic sensor of at least one acoustic sensor 140 may be positioned to sense acoustic signals 132 originating from material feed line 150. The at least one acoustic sensor 140 may be located near a component or at a zone within the thermal spray system 100, or may be oriented towards a component to sense sound from the component, or otherwise more accurately attribute the sound to a source. In an example, at least one acoustic sensor 140 may include multiple acoustic sensors forming an acoustic sensor network that captures sound generated by various components of thermal spray system 100.

As described above, computing device 180 may analyze at least one time-dependent acoustic data signal 142 to determine information about one or more process attributes of thermal spray system 100, which may include, for example, a component configuration, component wear, process parameters, or process deviations of thermal spray system 100. For example, computing device 180 may be configured to receive the at least one time-dependent acoustic data signal 142, transform the at least one time-dependent acoustic data signal 142 to a frequency-domain spectrum, and determine a process attribute by identifying at least one characteristic of the frequency-domain spectrum. As described above, each of the plurality of process attributes of thermal spray system 100 may be associated with at least one respective frequency band. In some examples, computing device 180 may analyze at least one time-dependent acoustic data signal 142 to determine whether process attributes associated with the process performed by thermal spray system 100 are within a nominal or expected range, or if the process attributes are varying compared to the nominal or expected range.

In some examples, because of the different positions of at least one acoustic sensor 140, computing device 180 may analyze the at least time-dependent acoustic data signal 132 to determine information related to particular components of thermal spray system 100. For example, computing device 180 may utilize the intensity of respective frequency components of at least one time-dependent acoustic data signal 142 to determine a distance from the acoustic sensor from which the at least one time-dependent acoustic data signal 142 was received to the component generating the acoustic signal, and may attribute the acoustic signal to that component. Additionally or alternatively, computing device 180 may utilize data indicative of the position and/or orientation of the acoustic sensor from which the at least one time-dependent acoustic data signal 142 was received relative to a selected component to the acoustic signal to a component. In this way, computing device 180 may analyze the at least one time-dependent acoustic data signal 142 or multiple time-dependent acoustic data signals to determine process attributes for a plurality of components of the thermal spray system.

In some examples, computing device 180 may analyze at least one acoustic data signal 142 to identify process attributes, including process parameters, component wear, or both that may result in unsatisfactory coating characteristics or other undesirable conditions of thermal spray system 100. In some examples, by utilizing at least one time-dependent acoustic data signal 142, computing device 180 may perform real-time or near-real-time analysis of the operation of thermal spray system 100. For example, monitoring a signal representative of one or more outputs of thermal spray system 100 may provide a more accurate indication of process attributes of thermal spray system 100, e.g., compared to monitoring inputs to thermal spray system 100 using a flow meter, flow controller, amp meter, or voltmeter.

Figure 2:
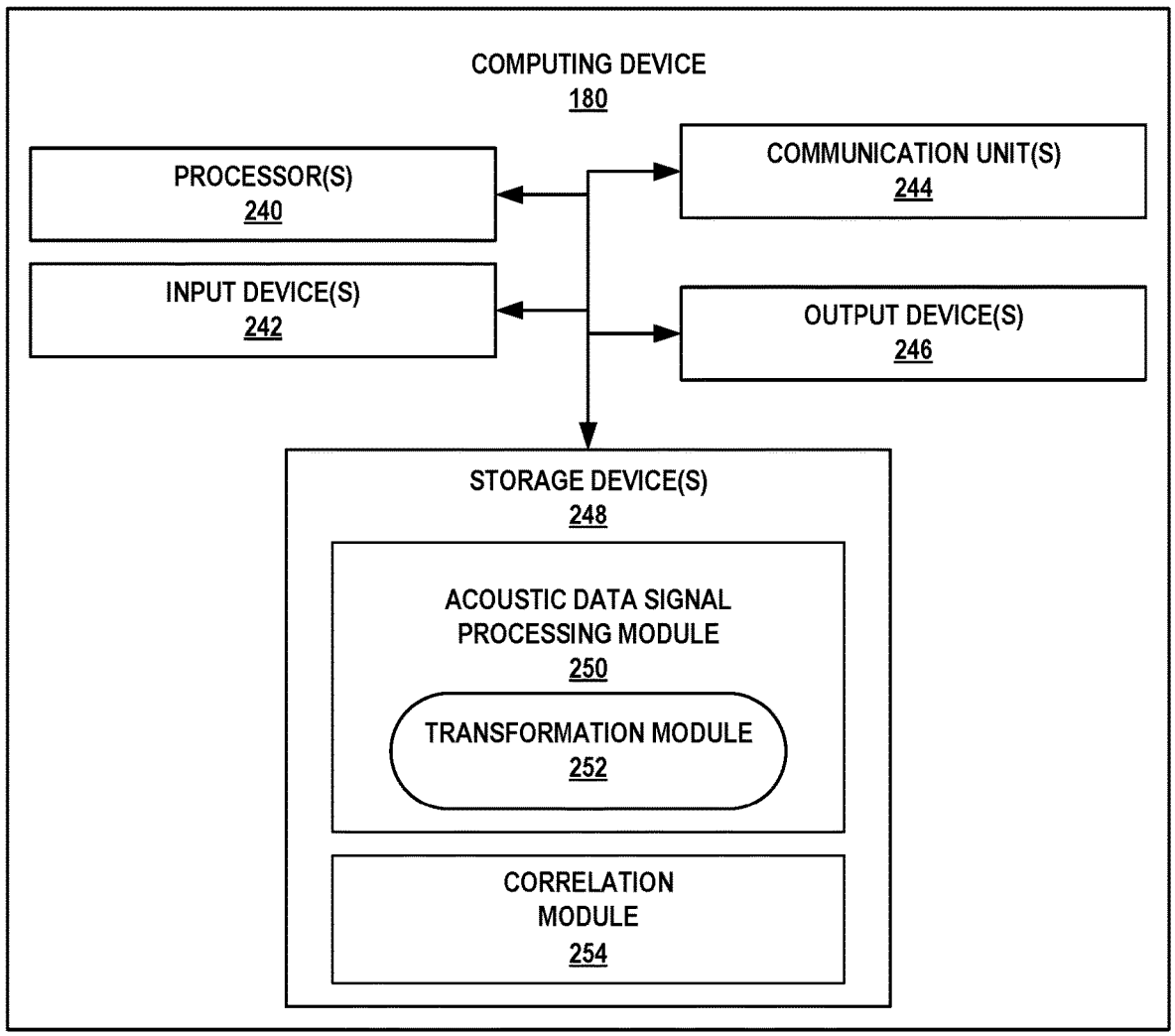
FIG. 2 is a conceptual block diagram illustrating an example of a computing device for analyzing an acoustic signal generated by a thermal spray system performing a process possessing a plurality of process attributes to determine a process attribute of the plurality of process attributes.

FIG. 2 is a conceptual block diagram illustrating an example of computing device 180 illustrated in FIG. 1. In some examples, computing device 180 may include, for example, a desktop computer, a laptop computer, a workstation, a server, a mainframe, a cloud computing system, or the like. In some examples, computing device 180 controls the operation of system 100, including, for example, thermal spray gun 120, energy source 124, entry flowstream 130, exit flowstream 136, acoustic sensors 140, spray material feed 150, and spray target 160.

In the example illustrated in FIG. 2, computing device 180 includes one or more processors 240, one or more input devices 242, one or more communication units 244, one or more output devices 246, and one or more storage devices 248. In some examples, one or more storage devices 248 stores acoustic data signal processing module 250, transformation module 252, and correlation module 254. In other examples, computing device 180 may include additional components or fewer components than those illustrated in FIG. 2.

One or more processors 240 are configured to implement functionality and/or process instructions for execution within computing device 180. For example, processors 240 may be capable of processing instructions stored by storage device 248. Examples of one or more processors 40 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 248 may be configured to store information within computing device 180 during operation. Storage devices 248, in some examples, include a computer-readable storage medium or computer-readable storage device. In some examples, storage devices 248 include a temporary memory, meaning that a primary purpose of storage device 248 is not long-term storage. Storage devices 248, in some examples, include a volatile memory, meaning that storage device 248 does not maintain stored contents when power is not provided to storage device 248. Examples of volatile memories include random access memories (RAM), dynamic random access memories (DRAM), static random access memories (SRAM), and other forms of volatile memories known in the art. In some examples, storage devices 248 are used to store program instructions for execution by processors 240. Storage devices 248, in some examples, are used by software or applications running on computing device 180 to temporarily store information during program execution.

In some examples, storage devices 248 may further include one or more storage device 248 configured for longer-term storage of information. In some examples, storage devices 248 include non-volatile storage elements. Examples of such non-volatile storage elements include magnetic hard discs, optical discs, floppy discs, flash memories, or forms of electrically programmable memories (EPROM) or electrically erasable and programmable (EE-PROM) memories.

Computing device 180 further includes one or more communication units 244. Computing device 180 may utilize communication units 244 to communicate with external devices (e.g., thermal spray gun 120, entry flowstream 130, exit flowstream 136, acoustic sensor 140, spray material 150, and spray target 160) via one or more networks, such as one or more wired or wireless networks. Communication unit 244 may include a network interface card, such as an Ethernet card, an optical transceiver, a radio frequency transceiver, or any other type of device that can send and receive information. Other examples of such network interfaces may include WiFi radios or Universal Serial Bus (USB). In some examples, computing device 180 utilizes communication units 244 to wirelessly communicate with an external device such as a server.

Computing device 180 also includes one or more input devices 242. Input devices 242, in some examples, are configured to receive input from a user through tactile, audio, or video sources. Examples of input devices 242 include a mouse, a keyboard, a voice responsive system, video camera, microphone, touchscreen, or any other type of device for detecting a command from a user.

Computing device 180 may further include one or more output devices 246. Output devices 246, in some examples, are configured to provide output to a user using audio or video media. For example, output devices 246 may include a display, a sound card, a video graphics adapter card, or any other type of device for converting a signal into an appropriate form understandable to humans or machines. In some example, computing device 180 outputs a representation of one or more of the at least one time-dependent acoustic data signal 142, of the frequency-domain spectrum, of the at least one characteristic of the frequency-domain spectrum, or of the process attribute that the at least one characteristic is indicative of, via output devices 246.

In some examples, computing device 180 may generate an alert in response to the least one attribute, via output devices 246. For example, computing device 180 may generate auditory signals, such as a beep, an alert tone, or an alerting sound, or visual signals, such as an icon on a display, flashing lights, or a combination of visual and audible signals, to indicate a process attribute variance or a process attribute deviation. In some examples, an operator may thus be alerted, and may choose to investigate thermal spray system 100. As another example, computing device 180 may generate an alert that is transmitted over a network to another computing device, including a hand-held computing device, for instance, a cellphone. The alert signal may include information about the process attribute, for instance, a process parameter, or a variance in the process parameter, or a process deviation status, or an identification of the process deviation.

Computing device 180 also may include an acoustic data signal processing module 250 and a correlation module 254. In some examples, acoustic data signal processing module 250 pre-processes or processes at least one time-dependent acoustic data signal 142 to prepare at least one time-dependent acoustic data signal 142 for analysis by correlation module 254, and correlation module 254 analyzes at least one time-dependent acoustic data 142 signal to determine the process attribute. In some examples, acoustic data signal processing module 250 may include a transformation module 252 for transforming at least one time-dependent acoustic data signal 142 from a time-domain spectrum to a frequency-domain spectrum. Functions performed by acoustic data signal processing module 250, transformation module 252 and correlation module 254 are explained below with reference to the example flow diagram illustrated in FIG. 3.

Acoustic data signal processing module 250, transformation module 252, and correlation module 254 may be implemented in various ways. For example, acoustic data signal processing module 250, transformation module 252, and/or correlation module 254 may be implemented as software, such as an executable application or an operating system, or firmware executed by one or more processors 240. In other examples, acoustic data signal processing module 250, transformation module 252, and/or correlation module 254 may be implemented as part of a hardware unit of computing device 180. In some examples, acoustic data signal processing module 250 includes transformation module 252, as shown in FIG. 2. In some examples, transformation module 252 is separate from acoustic data signal processing module 250.

Computing device 180 may include additional components that, for clarity, are not shown in FIG. 2. For example, computing device 180 may include a power supply to provide power to the components of computing device 180. Similarly, the components of computing device 180 shown in FIG. 2 may not be necessary in every example of computing device 180.

Examples of thermal spray system 100 and computing device 180 are described with reference to FIGS. 1 and 2 above, including examples of at least one acoustic sensor 140 for generating at least one time-dependent acoustic data signal 142 indicative of acoustic signals 132 generated by thermal spray system 100. Example techniques for analyzing at least one time-dependent data signals to determine a process attribute of a process performed by thermal spray system 100 are described with reference to FIG. 3 below.

Figure 3:
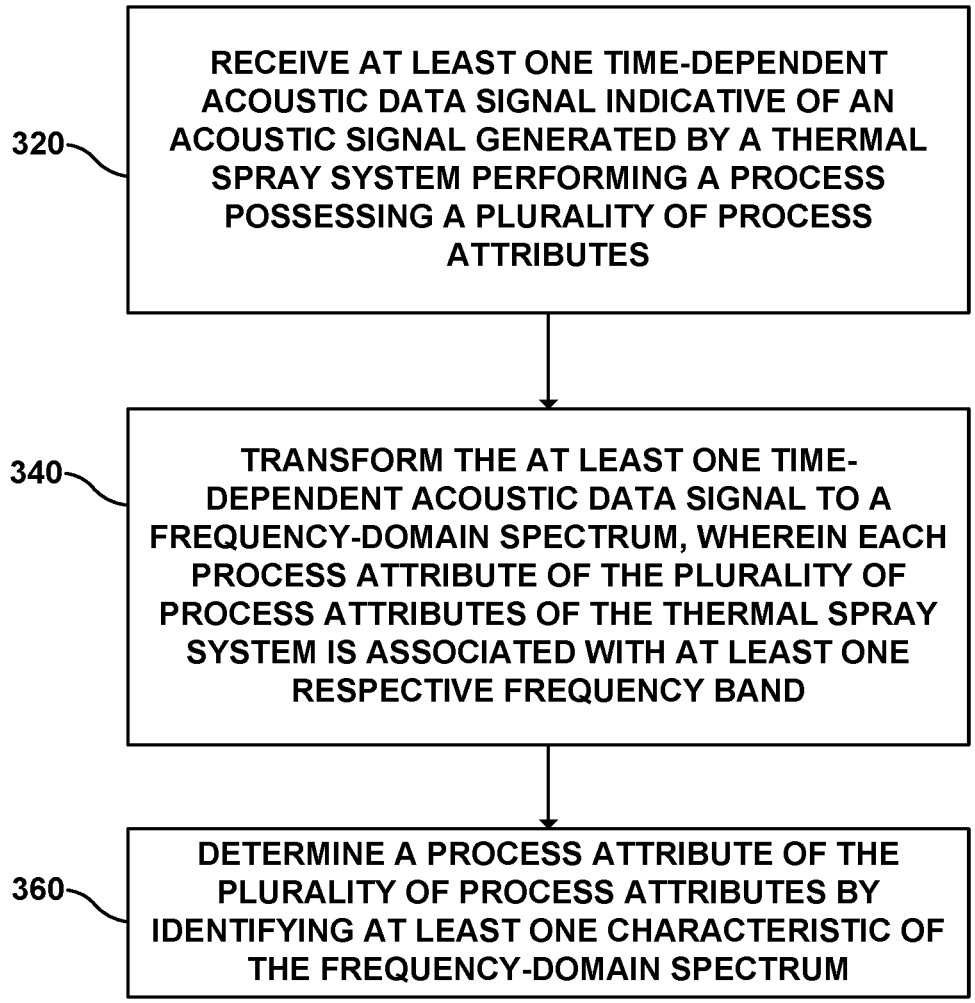
FIG. 3 is a flow diagram illustrating an example technique for analyzing an acoustic signal generated by a thermal spray system performing a process possessing a plurality of process attributes to determine a process attribute of the plurality of process attributes.

FIG. 3 is a flow diagram illustrating an example technique for analyzing an acoustic signal generated by a thermal spray system performing a process possessing a plurality of process attributes to determine a process attribute of the plurality of process attributes. In some examples, a computing device, such as computing device 180, may implement the technique of FIG. 3 to analyze the at least one time-dependent signal 142 indicative of acoustic signals 132 generated by thermal spray system 100 performing a process possessing a plurality of process attributes, described in various examples with reference to FIG. 1 above, to determine a process attribute of the plurality of process attributes. The technique of FIG. 3 will be described with reference to thermal spray system 100 of FIG. 1, and computing device 180 of FIGS. 1 and 2, for purposes of description only. It will be appreciated that the technique of FIG. 3 may be used to analyze at least one acoustic data signal to determine a process attribute of processes performed by other thermal spray systems, that other computing devices may implement the technique of FIG. 3, or both.

The technique of FIG. 3 includes receiving, by computing device 180, from at least one acoustic sensor 140, at least one time-dependent acoustic data signal 142 indicative of acoustic signals 132 generated by thermal spray system 100 (320). In some examples, at least one time-dependent acoustic data signal 142 may include analog signals, and acoustic data signal processing module 250 of computing device 180 may process at least one acoustic data signal 142 by performing an analog-to-digital conversion. In other examples, the received at least one time-dependent acoustic data signal 142 may include digital signals and acoustic data signal processing module 250 may not perform analog-to-digital conversion of at least one time-dependent acoustic data signal 142. In some examples, acoustic data signal processing module 250 of computing device 180 may filter at least one acoustic data signal 142 through signal processing filters such as band pass filters, high pass filters, low pass filters, comb filters, notch filters, or other filters, for instance, deconvolution filters, or noise filters to filter out undesirable signal components, such as noise, superfluous signal components, such as harmonics, or to reduce or compress the information in at least one acoustic data signal 142.

The technique of FIG. 3 also includes transforming, by transformation module 252 of computing device 180, at least one time-dependent acoustic data signal 142 to a frequency-domain spectrum (340). The frequency-domain spectrum may include intensity or amplitude as a function of frequency. In some examples, transformation module 252 of computing device 180 transforms at least one time-dependent acoustic data signal 142 to a frequency-domain spectrum using at least one of a fast Fourier transform or a discrete Fourier transform. In some examples, transformation module 252 may perform the transformation before, during or after other processing such as filtering described above.

The technique of FIG. 3 further includes determining, by correlation module 254 of computing device 180, a process attribute of the plurality of process attributes by identifying at least one characteristic of the frequency-domain spectrum (360). As described above, in some examples, each process attribute of the plurality of process attributes is associated with at least one respective frequency band in the frequency-domain spectrum. For example, nozzle wear of thermal spray gun 120 may be associated with a first frequency band, and gas flow through gas feed line 130 may be associated with a second frequency band. Other examples are also contemplated, for example, those described with respect to FIG. 1. Therefore, correlation module 254 may determine the process attribute based at least in part on the identified at least characteristic of the frequency-domain spectrum according to one or more example techniques described below.

Computing device 180 may identify at least one characteristic of the frequency-domain spectrum using one or more of the example techniques described below. In some examples, correlation module 254 may analyze the entire frequency-domain spectrum to identify at least one characteristic of the frequency-domain spectrum (360). For example, correlation module 254 may compare the entire frequency-domain spectrum with a second frequency-domain spectrum to identify at least one characteristic of the frequency-domain spectrum (360). In some examples, the second frequency-domain spectrum may be a known or reference frequency-domain spectrum, such as sample frequency-domain spectrum obtained from another known thermal spray system performing a known thermal spray process or a calculated frequency-domain spectrum. In this way, correlation module 254 may compare the entire frequency-domain spectrum to a frequency-domain spectrum representative of expected operation of thermal spray system 100.

In other examples, the second frequency-domain spectrum may be a past frequency-domain spectrum obtained from at least one time-dependent acoustic data signal 142 over a past interval of time from thermal spray system 100. The second frequency-domain spectrum may include, for example, a past frequency-domain spectrum obtained during the process, so that correlation module 254 compares the frequency-domain spectrum at a present interval of time with the frequency-domain spectrum at a past interval of time to identify the at least one characteristic. In this way, correlation module 254 may identify changes of the frequency-domain spectrum relative to past operation of thermal spray system 100 and may determine changes over time of operation of thermal spray system 100.

In some examples, correlation module 254 may then determine the process attribute by at least selecting at least one of a representative frequency or a representative intensity of the frequency within the frequency-domain spectrum as the at least one characteristic based on the comparison of the entire frequency-domain spectrum with the known frequency-domain spectrum (360). For example, correlation module 254 may identify at least one frequency for which an intensity has changed between the second frequency-domain spectrum and the frequency-domain spectrum determined based on at least one time-dependent acoustic data signal 142, and may select that frequency as the process attribute or for use in determining the process attribute. In some examples, correlation module 254 may identify a plurality of respective frequencies for which a respective intensity has changed between the second frequency-domain spectrum and the frequency-domain spectrum determined based on at least one time-dependent acoustic data signal 142, and may select each respective frequency as a process attribute or for use in determining a respective process attribute. In this way, in some examples, correlation module 254 may determine a plurality of process attributes for thermal spray system 100 based at least in part on at least one time-dependent acoustic data signal 142.

In other examples, instead of analyzing the entire frequency-domain spectrum, correlation module 254 may analyze a selected portion of the frequency-domain spectrum to identify at least one characteristic of the frequency-domain spectrum (360). For example, identifying at least one characteristic of the frequency-domain spectrum (360) may include filtering, by acoustic data signal processing module 250, the at least one time-dependent acoustic data signal 142 to select a frequency band prior to transforming, by transformation module 252, at least one time-dependent acoustic data signal 142 to the frequency-domain spectrum (340), or selecting, by acoustic data signal processing module 250, a frequency band from the frequency-domain spectrum. In some examples, identifying the at least one characteristic of the frequency-domain spectrum (360) may further include analyzing, by correlation module 254, the selected frequency band to identify at least one characteristic of the frequency-domain spectrum (360). In some examples, correlation module 254 may compare the selected frequency band with a second frequency band, which may be analogous to the second frequency-domain spectrum described above. For example, the second frequency band may be a known or reference frequency-domain spectrum or may be a past frequency-domain spectrum obtained from at least one time-dependent acoustic data signal 142.

In some examples, determining the process attribute may include selecting, by correlation module 254, at least one of a frequency or an intensity of the frequency within the selected frequency band as the at least one characteristic based on the comparison of the selected frequency band with the known frequency band (360). For example correlation module 254 may extract a plurality of intensities from a selected frequency band of the frequency-domain spectrum, each intensity of the plurality of intensities corresponding to a respective frequency of a plurality of frequencies within the selected frequency band. In some examples, correlation module 254 may select at least one of an intensity of the plurality of intensities or the respective frequency of the plurality of frequencies as the at least one characteristic. In some examples, correlation module 254 may identify the maximum intensity of the plurality of intensities and select at least one of the maximum intensity (for instance, peal intensity) or the frequency associated with the maximum intensity (for instance, peak frequency) as the at least one characteristic.

In some examples, after determining the at least one characteristic of the frequency-domain spectrum, correlation module 254 may compare the at least one characteristic with a characteristic value or range of characteristic values to determine the process attribute (360). The at least one characteristic and the known or expected characteristic value or range of characteristic values may relate to aspects of process attributes (e.g., magnitude, variation, or the like), which may be associated with frequency values within a frequency band, may be associated with intensities of one or more frequencies within a frequency band, or both. For example, the magnitude of a process attribute may be related to the magnitude of intensities of at least one frequency within the respective frequency band associated with the process attribute, and changes in the process attribute may result in changes in the respective frequency band associated with the process attribute. In some of these examples, increases or decreases in the magnitude of a process attribute may result in corresponding increases or decreases in intensities of one or more frequencies within the respective frequency band associated with the process attribute. Alternatively or additionally, the occurrence of a phenomenon within thermal spray system may result in a change in the peak frequency, peak intensity, or both, exhibited by the respective frequency band associated with the process attribute responsible for the occurrence of the phenomenon. Therefore, correlation module 254 may compare the compare the at least one characteristic with a known or expected characteristic value or range of characteristic values to determine the process attribute.

Correlation module 254 may compare the at least one characteristic with a known or expected characteristic value or range of characteristic values to determine the process attribute using one or more of the following example techniques. In some examples, correlation module 254 may select the known or expected characteristic value or range of characteristic values from a second frequency-domain spectrum, such as a known frequency-domain spectrum obtained from a test or experimental process or a frequency-domain spectrum from a past time interval of the present process. In some examples, the known frequency-domain spectrum may include a frequency-domain spectrum obtained from a thermal spray process that resulted in satisfactory coating characteristics. In other examples, the known frequency-domain spectrum may be a reference frequency-domain spectrum that includes expected or nominal frequency content based on expected or nominal process attributes. Thus, comparing the at least one characteristic with known or expected characteristic value or range of characteristic values may allow correlation module 254 to determine the deviation or variation of a process attribute of the present process from the process attribute of a known process.

Comparing the at least one characteristic with a characteristic value or range of characteristic values obtained from the frequency-domain spectrum over a past time interval (360) may allow correlation module 254 to determine the change in the process attribute from the past time interval to the present time interval. In some examples, correlation module 254 may determine an increase or decrease in the intensity of a frequency in a selected frequency band compared to an intensity in the past frequency-domain spectrum as indicative of a respective increase or decrease in the magnitude of a process attribute associated with the selected frequency band.

In some examples, correlation module 254 identifies the at least one characteristic at a first interval of time, and compares it with a known characteristic value that is a value of the at least one characteristic at a second interval of time. In some examples, the first interval of time may be a present or recent interval of time, and the second interval of time may be a past interval of time. In some examples, the first interval of time may be associated with a known system performance, for instance, a known magnitude of a process attribute, and the second interval of time may be associated with an unknown system performance, for instance, an unknown magnitude of a process attribute. In some examples, correlation module 254 identifies the at least one characteristic at the first interval of time, and compares the at least one characteristic with a known or predetermined characteristic value or known or predetermined characteristic value range. In some examples, the at least one characteristic at the first interval of time includes at least one of an average intensity of the frequency-domain spectrum, a peak intensity of the frequency-domain spectrum, a selected frequency of the frequency-domain spectrum, or a frequency associated with a peak intensity of the frequency-domain spectrum and the predetermined characteristic value range includes a range of the corresponding characteristic.

In some examples, the process attribute may include nozzle wear, the at least one characteristic includes a peak frequency, and the predetermined characteristic value range includes a range of frequencies from about 13 kHz to about 15 kHz. In other examples, the process attribute includes nozzle wear, the at least one characteristic includes a peak intensity, and the known intensity value is about 30 dB and is associated with nozzle wear. In other examples, the process attribute includes nozzle wear, the at least one characteristic includes a peak frequency, and the known frequency value is about 4.76 kHz and associated with nozzle wear. In some examples, the process attribute includes powder pulsing, the at least one characteristic includes a peak frequency within a frequency band of 4 to 7.5 kHz, and the characteristic value range of frequencies greater than about 4.8 kHz is associated with powder pulsing. In some examples, the process attribute includes powder pulsing, the at least one characteristic includes a peak frequency within a frequency band of 7.5 to 15 kHz, and the characteristic value range of frequencies greater than about 9.6 kHz is associated with powder pulsing.

In these ways, correlation module 254 may determine at least one process attribute of the plurality of process attributes. In some examples, thermal spray system 100 may perform a process possessing a plurality of process attributes. In some examples, identifying the magnitude of a process attribute may be desirable. Correlation module 254 may determine the process attribute, for instance, a process parameter that may include at least one of a temperature, a pressure, a mass flow rate, a volumetric flow rate, a molecular flow rate, a molar flow rate, a composition or a concentration, of a flowstream flowing through thermal spray system 100, for instance, of gas flowing through gas feed line 130, or of exit flowstream 136, or of material flowing through material feed line 150 based at least in part on at least one time-dependent acoustic signal 142.

In some examples, thermal spray system 100 may exhibit unsatisfactory performance for an unknown reason that may be related to a process deviation. Computing device 180 may analyze at least one time-dependent acoustic data signal 142 by one or more example techniques described above with reference to FIG. 3 to determine the process deviation. In some examples, the process deviation may include at least one of material feed fluctuation, for instance, powder pulsing; flow blockage (for e.g., of one or more of gas feed line 130, exit flowstream 136, material feed line 150); gas leakage; a process deviation resulting from incompatibility (for e.g., wrong type or configuration of a component, for instance, using a nozzle that is unsuitable for a high viscosity flow); or wear of the at least one component, which may include at least one of wear of thermal spray gun 120, including wear of thermal spray outlet 126, wear of energy source 124, or wear of material inlet port 128.

In this way, computing device 180 may perform the examples techniques described above with reference to FIG. 3 to analyze at least one time-dependent acoustic data signal 142 to determine process attributes for a plurality of components of thermal spray system 100 performing a process, and determine whether process attributes are within a nominal or expected range, or if the process attributes are varying compared to an expected value.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer system-readable medium, such as a computer system-readable storage medium, containing instructions. Instructions embedded or encoded in a computer system-readable medium, including a computer system-readable storage medium, may cause one or more programmable processors, or other processors, to implement one or more of the techniques described herein, such as when instructions included or encoded in the computer system-readable medium are executed by the one or more processors. Computer system readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer system readable media. In some examples, an article of manufacture may comprise one or more computer system-readable storage media.

EXAMPLES

Example 1

$Ni_5Al$ powder was run through 8 plasma spray nozzles, and acoustic signals were recorded for about 5 minutes. A frequency spectrum was obtained from the acoustic signals, and peak frequencies and intensities were identified for each run. The results were repeated with the same conditions, and were further repeated at an increased hydrogen flow rate to achieve voltage comparable to new nozzle voltage state for those parameters.

The parameters used for each run are presented in TABLE 1.

TABLE 1

| Parameter Set | Current (Amperes) | Argon (Standard Liters per Minute) | H2 (Standard Liters per Minute) | Steady State Samples | Number of Nozzles Compared |
|---|---|---|---|---|---|
| BC-$Ni_5Al$ | 435 | 42 | 8 | 93 | 8 |
| Repeat | 435 | 42 | 8 | 39 | 6 |
| 72 V | 435 | 42 | >8 | 25 | 6 |

The nozzle used for all examples in Table 1 was a plasma spray nozzle for an Oerlikon Metco 9 MB plasma spray gun. The nozzle had convergent, straight, and divergent segments and is designed for argon and hydrogen plasma gases. Voltages ranged from 69.1V to 71.5V for the first run, and from 65.8V to 67.5V for the repeat run. Voltages for new guns were about 72V.

Figure 4:
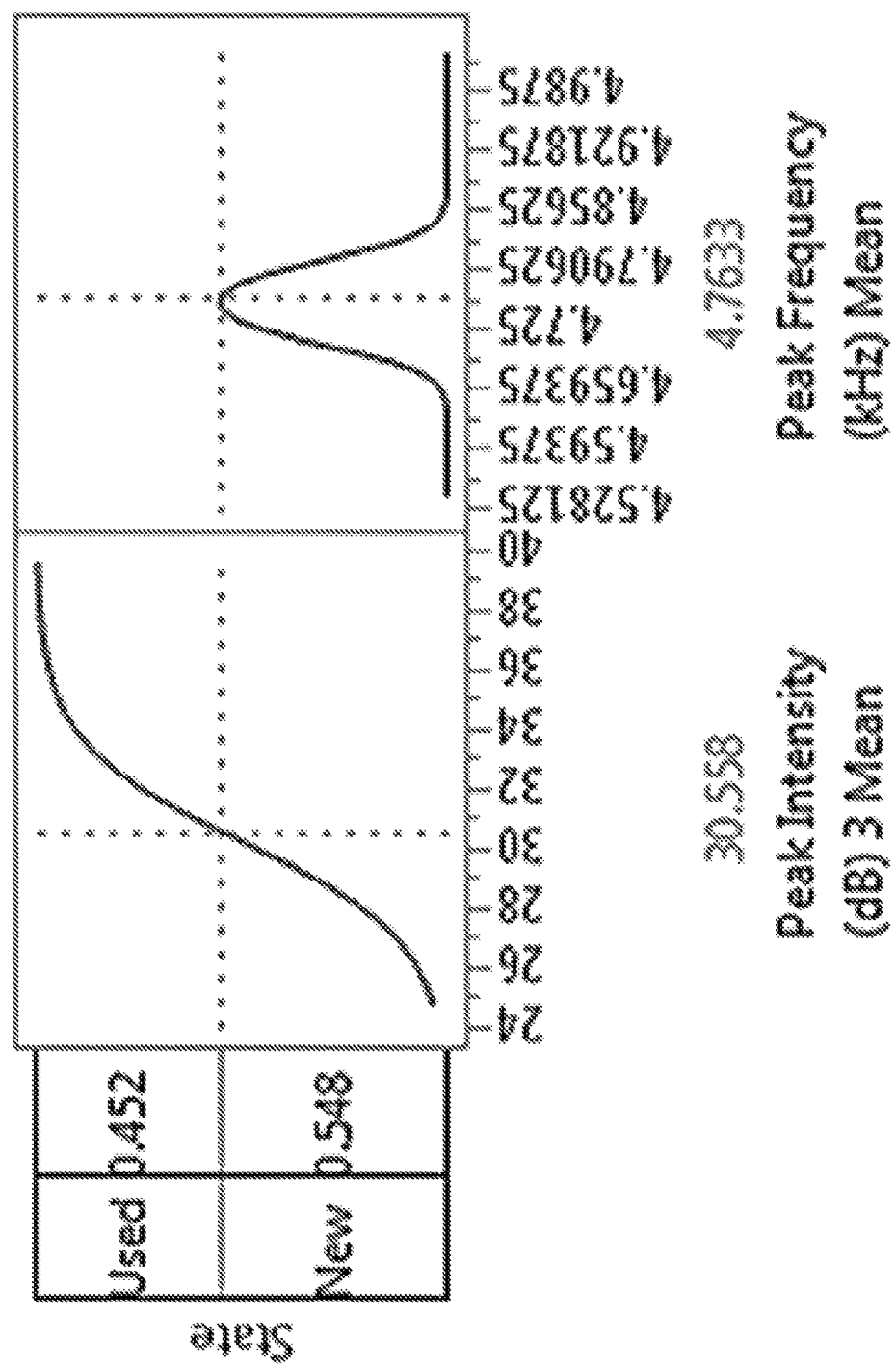
FIG. 4 is a chart presenting the probability of the state of a nozzle based on the peak intensity and peak frequency of a frequency-domain spectrum.

FIG. 4 is a chart presenting the probability of the state of a nozzle based on the peak intensity and peak frequency of a frequency-domain spectrum. The probability that a nozzle is new is plotted as a function of peak frequency. In this example, a peak intensity of higher than about 30 dB was indicative of a new nozzle, while a peak frequency of about 4.76 was indicative of a new nozzle.

Example 2

Six plasma spray nozzles of similar type to those used above in Example 1 were subjected to about 15 minutes of heavy use. A heavy use constituted spray parameters (current and gas flow rates) at the high end of what nozzles are safely capable of and is suspected to greatly shorten their useful life below the typical 40 hours. One plasma spray nozzle (labeled GH36) was subjected to about 30 minutes of normal use. Normal use constituted spray parameters (current, gas flow rates) that allowed the guns to last for their typical useful lifespan of about 40 hours.

Figure 5A:
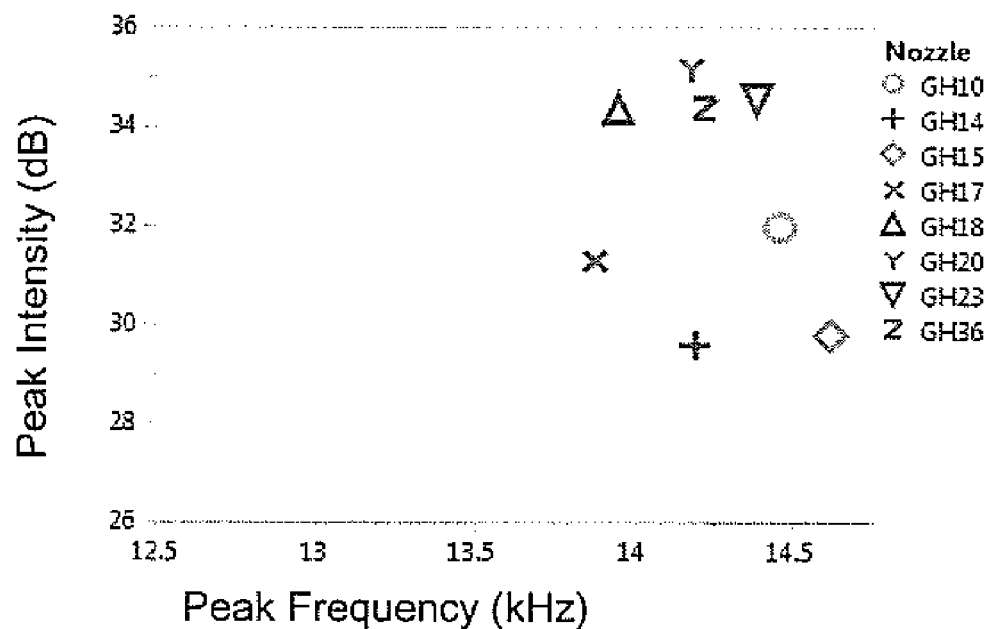
FIG. 5A is a chart presenting intensities of peak frequencies exhibited by plasma spray nozzles before use.
Figure 5B:
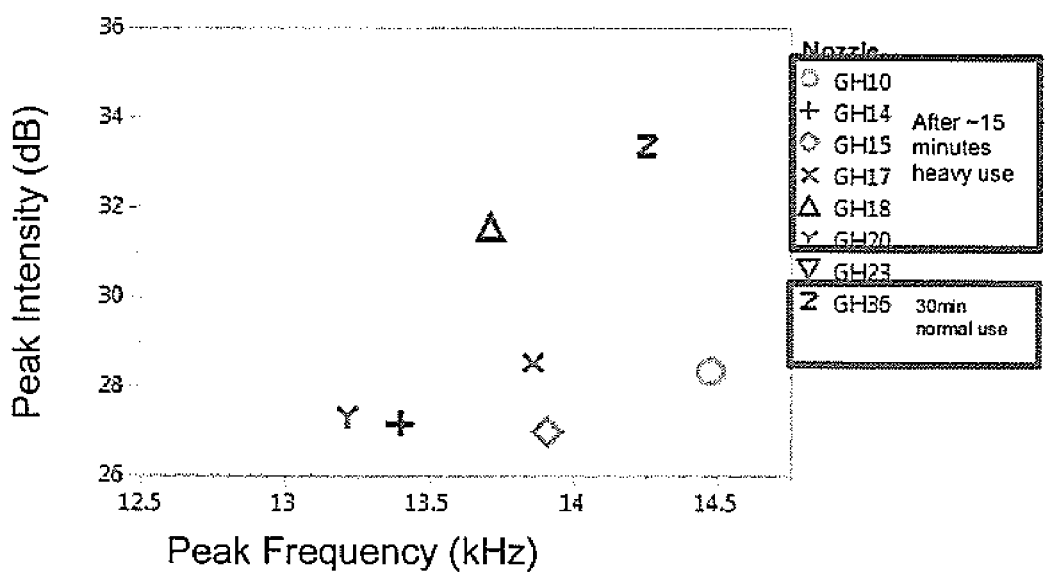
FIG. 5B is a chart presenting intensities of peak frequencies exhibited by plasma spray nozzles after use.

The acoustic signal generated by each of the plasma spray nozzles was transformed to a frequency-domain spectrum. Within a selected frequency band of about 12.5 kHz to about 15 kHz the peak frequencies and peak intensities associated with each nozzle before and after use were identified. FIG. 5A is a chart presenting intensities of peak frequencies exhibited by the plasma spray nozzles before use. FIG. 5B is a chart presenting intensities of peak frequencies exhibited by plasma spray nozzles after use. Nozzles GH10, GH14, GH15, GH17, GH18, and GH20 exhibited a reduction in peak intensity after about 15 minutes of heavy use. GH14, GH15 and GH20 exhibited a reduction in peak frequency, while GH10, GH14, GH17 and GH18 exhibited an increase in peak frequency after about 15 minutes of heavy use. GH36 exhibited a decrease in the peak intensity, while exhibiting an increase in the peak frequency. Thus a frequency band of about 13 kHz to about 15 kHz is indicative of nozzle wear.

Example 3

Figure 6:
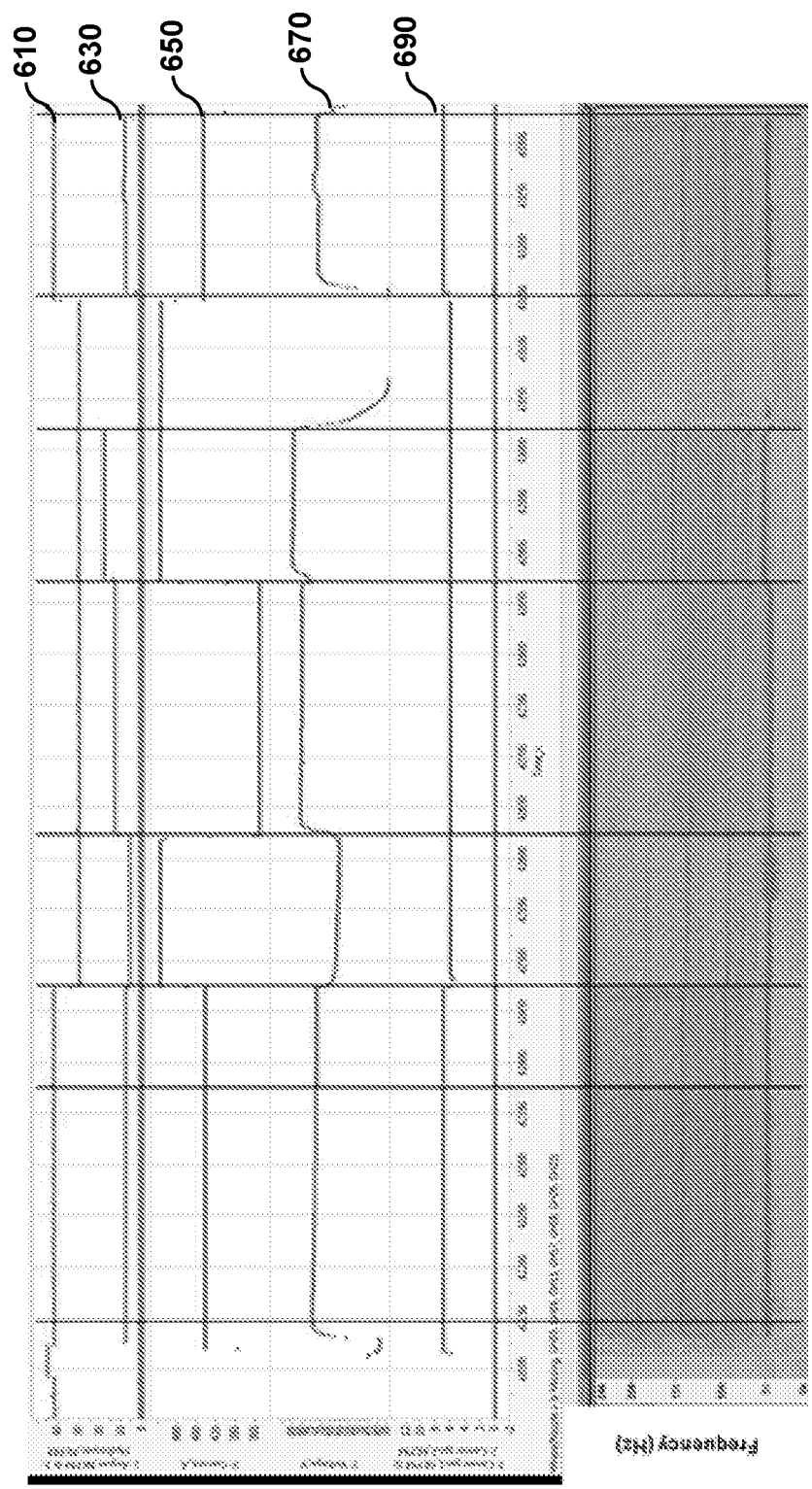
FIG. 6 is a chart presenting acoustic frequency spectrum associated with different thermal spray gun parameters as a function of time.

FIG. 6 is a chart presenting acoustic frequency spectrum associated with different thermal spray gun parameters as a function of time. Gun inputs including argon and hydrogen gas flow rates, gun current, gun voltage, and carrier gas flow rates with or without powder in the carrier gas stream were recorded as a function of time, presented in the upper half of the chart of FIG. 6. A spectrogram was plotted, with frequency as a function of time, colored according to intensity, as presented in the lower half of the chart of FIG. 6. Changes in the input parameters resulted in corresponding changes in peak frequencies and intensities, as reflected by the black vertical lines in the chart of FIG. 6 that mark a change in process parameters. Curve 610 represents argon gas flow rate as a function of time. Curve 630 represents hydrogen gas flow rate as function of time. Curve 650 represents gun current as a function of time. Curve 670 represents gun voltage as a function of time. Curve 690 represents carrier gas flow rate as a function of time.

Example 4

Figure 7A:
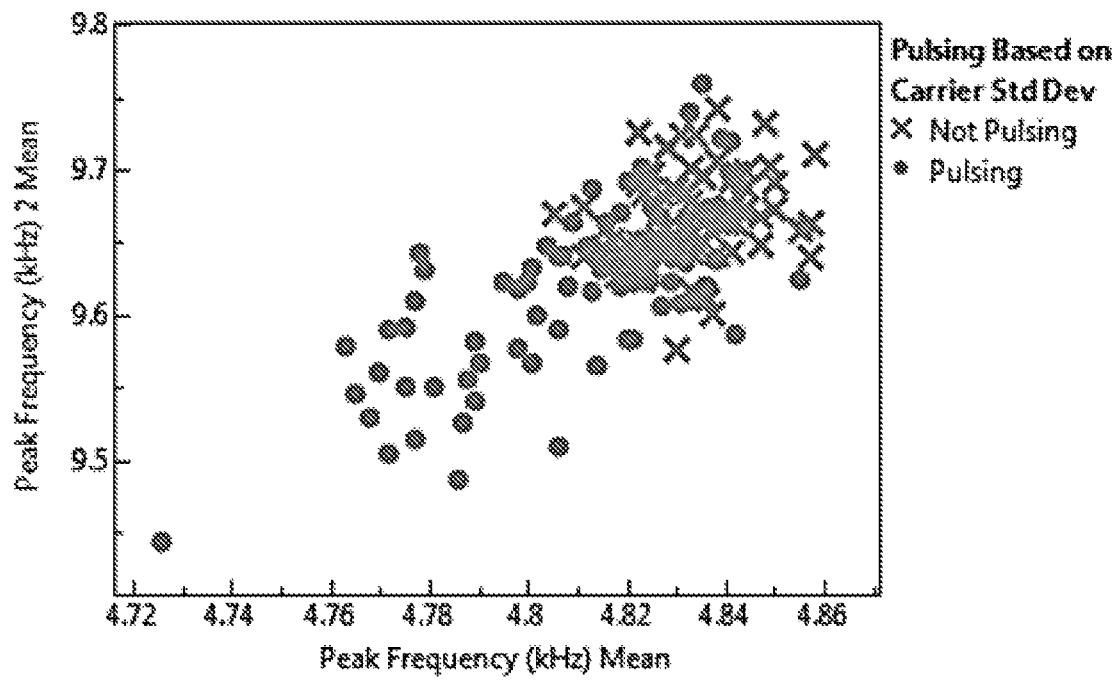
FIGS. 7A and 7B illustrate charts presenting an example observed relationship between peak frequencies and powder pulsing.
Figure 7B:
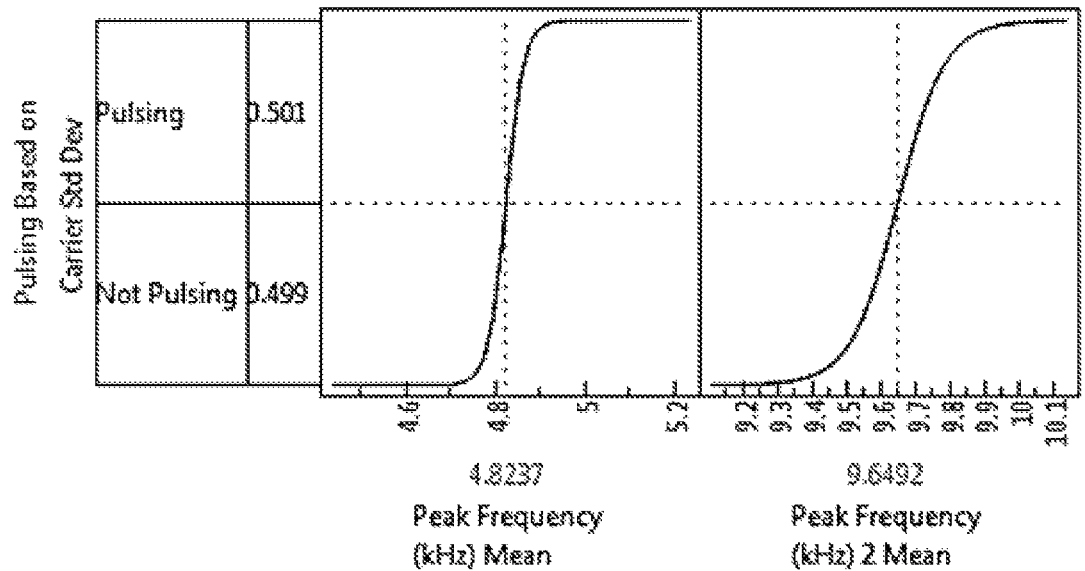

FIGS. 7A and 7B illustrate charts presenting an example observed relationship between peak frequencies and powder pulsing. FIG. 7A is a chart presenting peak frequency in a frequency band of 4 to 7.5 kHz plotted versus peak frequency in a frequency band of 7.5 to 15 kHz, for spray gun runs in which powder pulsing was detected (dot) and spray gun runs in which powder pulsing was not detected (cross). FIG. 7B is a chart presenting the probability that a case is not pulsing as a function of peak frequency in two frequency bands. A peak frequency of lower than about 4.8 kHz in the 4 to 7.5 kHz frequency band and a peak frequency of lower than about 9.6 kHz in the 7.5 to 15 kHz frequency band was indicative of occurrence of powder pulsing, while peak frequencies greater than about these respective thresholds were indicative of non-occurrence of powder pulsing.

Various examples have been described. These and other examples are within the scope of the following claims.

The invention claimed is:
1. A system comprising:
   a thermal spray system comprising a plurality of components comprising at least two of a thermal spray gun, an energy source, a powder port, or a material inlet port, the thermal spray system configured to perform a thermal spray process possessing a plurality of process attributes;
   a plurality of acoustic sensors configured to generate a plurality of time-dependent acoustic data signals indicative of respective acoustic signals generated by the thermal spray system; and
   a computing device comprising:
      an acoustic data signal processing module configured to:
         receive the plurality of time-dependent acoustic data signals;
         identify a component of the plurality of components associated with a time-dependent acoustic data signal of the plurality of time-dependent acoustic data signals based on at least one of the acoustic sensors associated with the time-dependent acoustic data signal or intensity of respective frequency components of the time-dependent acoustic data signal; and
         transform the identified time-dependent acoustic data signal to a frequency-domain spectrum; and
      a correlation module configured to:
         determine a process attribute associated with the identified component by identifying at least one frequency or amplitude characteristic of the frequency-domain spectrum;
         determine a deviation or variation of the process attribute from a nominal or expected range based on the at least one frequency or amplitude characteristic and a known or expected frequency or amplitude value associated with the process attribute, wherein the process attribute comprises at least one of:
            a process parameter comprising at least one of a temperature, a pressure, a mass flow rate, a volumetric flow rate, a molecular flow rate, a molar flow rate, a composition or a concentration, of a flowstream through the identified component, or
            a process deviation status comprising at least one of powder pulsing, material feed fluctuation, flow blockage, gas leakage, or a process deviation resulting from incompatibility or wear of the identified component; and generate an alert in response to determining the deviation or variation of the process attribute from the nominal or expected range.

2. The system of claim 1, wherein the acoustic data signal processing module is configured to transform the identified time-dependent acoustic data signal to the frequency-domain spectrum using at least one of a discrete Fourier transform or a fast Fourier transform.

3. The system of claim 1, wherein the correlation module is configured to determine the process attribute by at least:
extracting a plurality of intensities from a selected frequency band of the frequency-domain spectrum, each intensity of the plurality of intensities corresponding to a respective frequency of a plurality of frequencies within the selected frequency band; and
selecting at least one of an intensity of the plurality of intensities or the respective frequency of the plurality of frequencies as the at least one frequency or amplitude characteristic.

4. The system of claim 1, wherein the at least one frequency or amplitude characteristic comprises at least one of a peak frequency or a peak intensity.

5. The system of claim 1, wherein the correlation module is further configured to determine the process attribute by at least comparing the at least one frequency or amplitude characteristic at a first interval of time with the at least one frequency or amplitude characteristic at a second interval of time.

6. The system of claim 1, wherein the correlation module is further configured to determine the process attribute by at least comparing the at least one frequency or amplitude characteristic at a third interval of time with a predetermined frequency or amplitude characteristic value range.

7. The system of claim 1, wherein the correlation module is further configured to determine the process attribute by at least comparing the at least one frequency or amplitude characteristic at a fourth interval of time with a respective known frequency or amplitude characteristic of a known frequency-domain spectrum.

8. The system of claim 1, wherein the energy source comprises at least a plasma electrode.

9. The system of claim 1, wherein the computing device further comprises an output device configured to output a representation of at least one of the identified time-dependent acoustic data signal, the frequency-domain spectrum, the at least one frequency or amplitude characteristic of the frequency-domain spectrum, or the process attribute of which the at least one characteristic is indicative.

10. The system of claim 1, wherein the process comprises at least one of spraying, gas combustion, electrical arcing, plasma generation, flow shock, powder transport, or mechanical motion.

11. A method comprising:
receiving, by a computing device, from a plurality of acoustic sensors, a plurality of time-dependent acoustic data signals indicative of respective acoustic signals generated by a thermal spray system comprising a plurality of components comprising at least two of a thermal spray gun, an energy source, a powder port, or a material inlet port, the thermal spray system performing a process possessing a plurality of process attributes;
identifying, by the computing device, a component of the plurality of components associated with a time-dependent acoustic data signal of the plurality of time-dependent acoustic data signals based on at least one of the acoustic sensors associated with the time-dependent acoustic data signal or intensity of respective frequency components of the time-dependent acoustic data signal;
transforming, by the computing device, the identified time-dependent acoustic data signal to a frequency-domain spectrum;
determining, by the computing device, a process attribute associated with the identified component by identifying at least one frequency or amplitude characteristic of the frequency-domain spectrum;
determining, by the computing device, a deviation or variation of the process attribute from a nominal or expected range based on the at least one frequency or amplitude characteristic and a known or expected frequency or amplitude value associated with the process attribute, wherein the process attribute comprises at least one of:
a process parameter comprising at least one of a temperature, a pressure, a mass flow rate, a volumetric flow rate, a molecular flow rate, a molar flow rate, a composition or a concentration, of a flow-stream through the identified component, or
a process deviation status comprising at least one of powder pulsing, material feed fluctuation, flow blockage, gas leakage, or a process deviation resulting from incompatibility or wear of the identified component; and
generating, by the computing device, an alert in response to determining the deviation or variation of the process attribute.

12. The method of claim 11, wherein transforming the identified time-dependent acoustic data signal into the frequency-domain spectrum comprises performing at least one of a discrete Fourier transform or a fast Fourier transform.

13. The method of claim 11, wherein determining the process attribute comprises:
extracting a plurality of intensities from a selected frequency band of the frequency-domain spectrum, each intensity of the plurality of intensities corresponding to a respective frequency of a plurality of frequencies within the selected frequency band; and
selecting at least one of an intensity of the plurality of intensities or the respective frequency of the plurality of frequencies as the at least one frequency or amplitude characteristic.

14. The method of claim 11, wherein the at least one frequency or amplitude characteristic comprises at least one of a peak frequency or a peak intensity.

15. The method of claim 11, wherein determining the process attribute further comprises comparing the at least one frequency or amplitude characteristic at a first interval of time with the at least one frequency or amplitude characteristic at a second interval of time.

16. The method of claim 11, wherein determining the process attribute further comprises comparing the at least one frequency or amplitude characteristic at a third interval of time with a respective predetermined frequency or amplitude characteristic value range.

17. The method of claim 11, wherein determining the process attribute further comprises comparing the at least one frequency or amplitude characteristic at a fourth interval of time with a respective known frequency or amplitude characteristic of a known frequency-domain spectrum.

18. A non-transitory computer readable storage medium comprising instructions that, when executed, cause at least one processor to:
receive, from a plurality of acoustic sensors, a plurality of time-dependent acoustic data signals indicative of respective acoustic signals generated by a thermal spray system comprising a plurality of components comprising at least two of a thermal spray gun, an energy source, a powder port, or a material inlet port, the thermal spray system performing a process possessing a plurality of process attributes;

identify a component of the plurality of components associated with a time-dependent acoustic data signal of the plurality of time-dependent acoustic data signals based on at least one of the acoustic sensors associated with the time-dependent acoustic data signal or intensity of respective frequency components of the time-dependent acoustic data signal;

transform the identified time-dependent acoustic data signal to a frequency-domain spectrum;

determine a process attribute associated with the identified component by identifying at least one frequency or amplitude characteristic of the frequency-domain spectrum;

determine a deviation or variation of the process attribute from a nominal or expected range based on the at least one frequency or amplitude characteristic and a known or expected frequency or amplitude value associated with the process attribute, wherein the process attribute comprises at least one of:
- a process parameter comprising at least one of a temperature, a pressure, a mass flow rate, a volumetric flow rate, a molecular flow rate, a molar flow rate, a composition or a concentration, of a flowstream through the system component, or
- a process deviation status comprising at least one of powder pulsing, material feed fluctuation, flow blockage, gas leakage, or a process deviation resulting from incompatibility or wear of the system component; and generate an alert in response to determining the deviation or variation of the process attribute.

\* \* \* \* \*